April 28, 1925.
A. D. GALLAGHER
WHEELED CULTIVATOR
Filed July 21, 1921
1,535,914
4 Sheets-Sheet 1
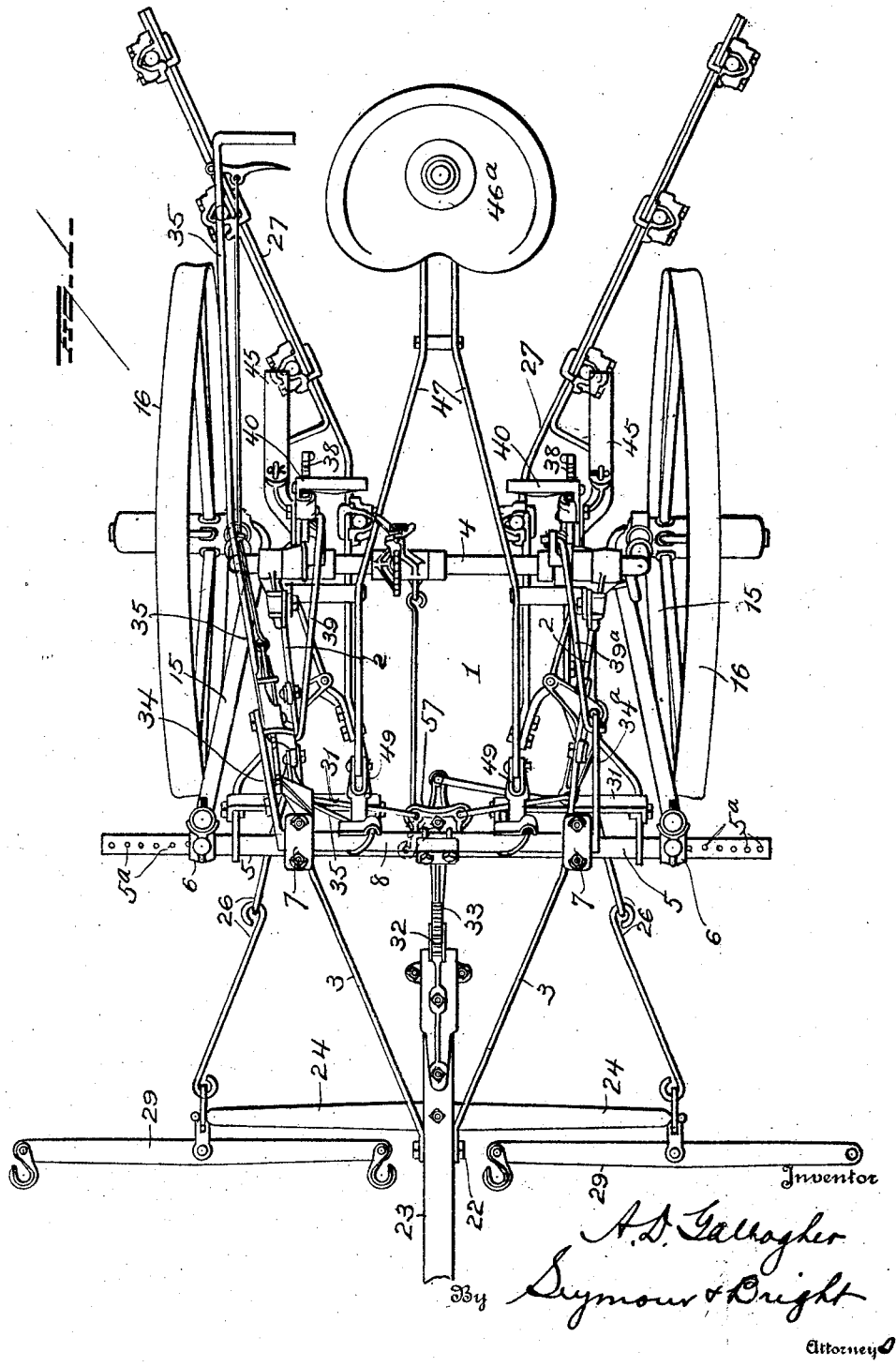
Inventor
A. D. Gallagher
By Seymour & Bright
Attorneys April 28, 1925.
A. D. GALLAGHER
WHEELED CULTIVATOR
Filed July 21, 1921
1,535,914
4 Sheets-Sheet 2
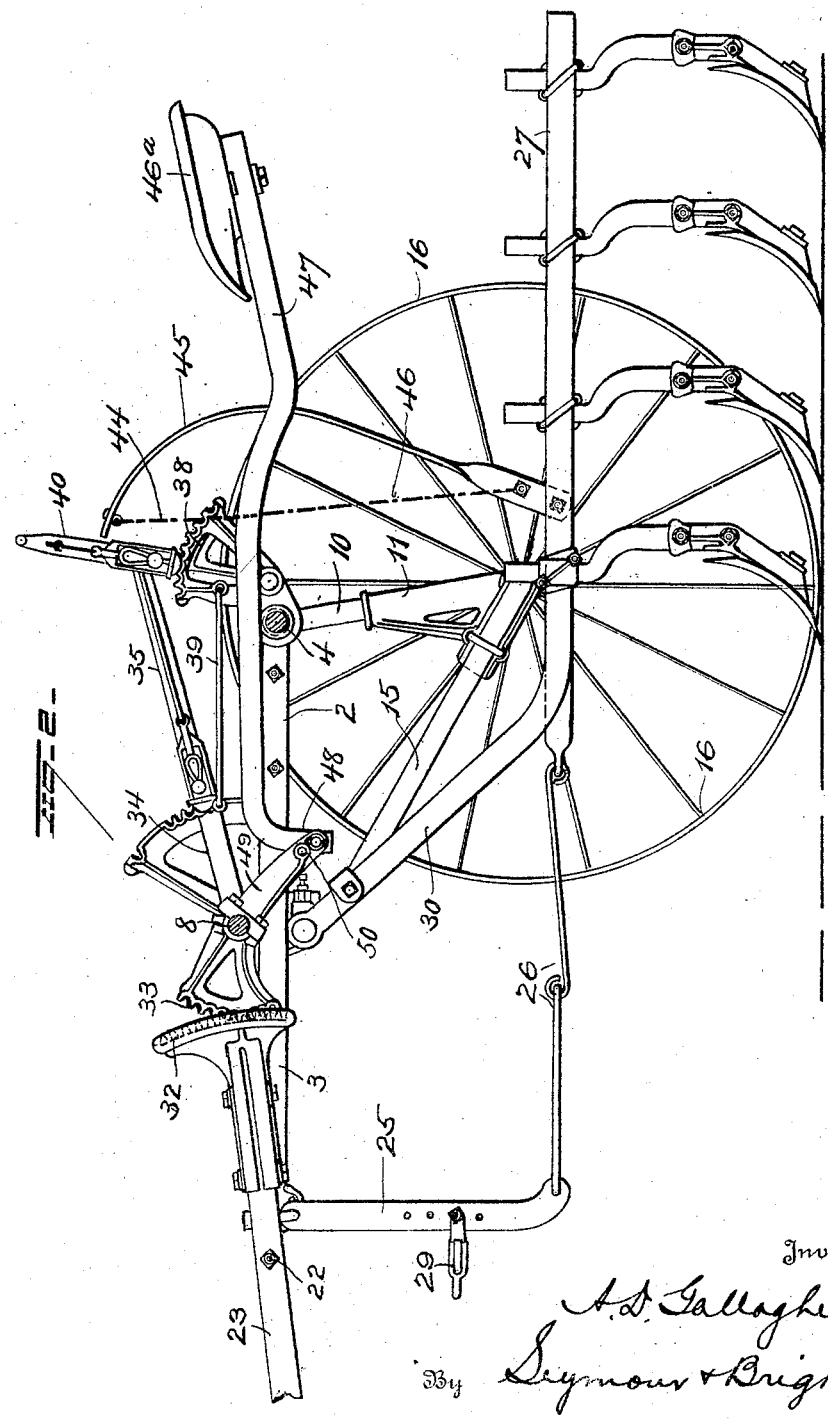

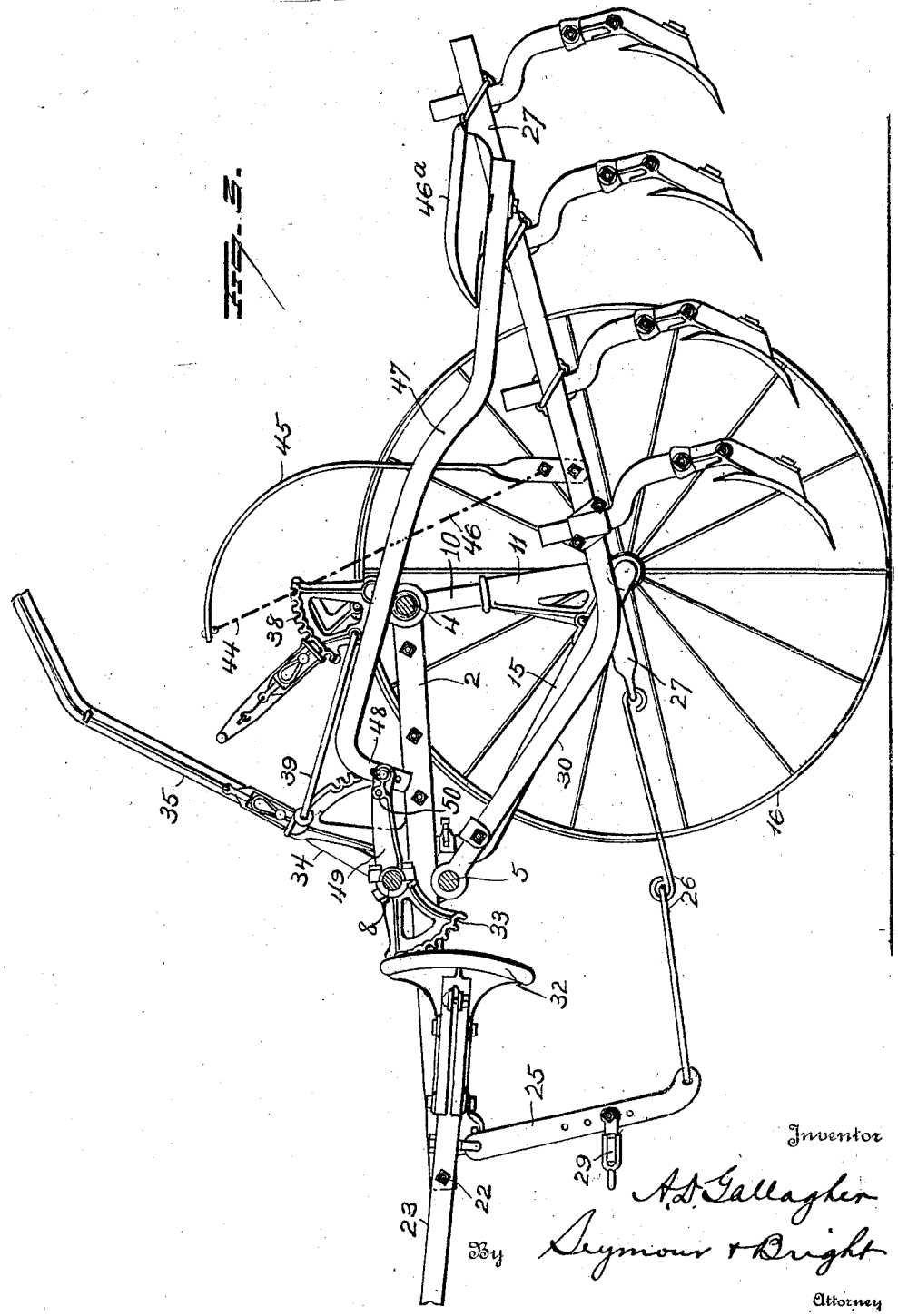

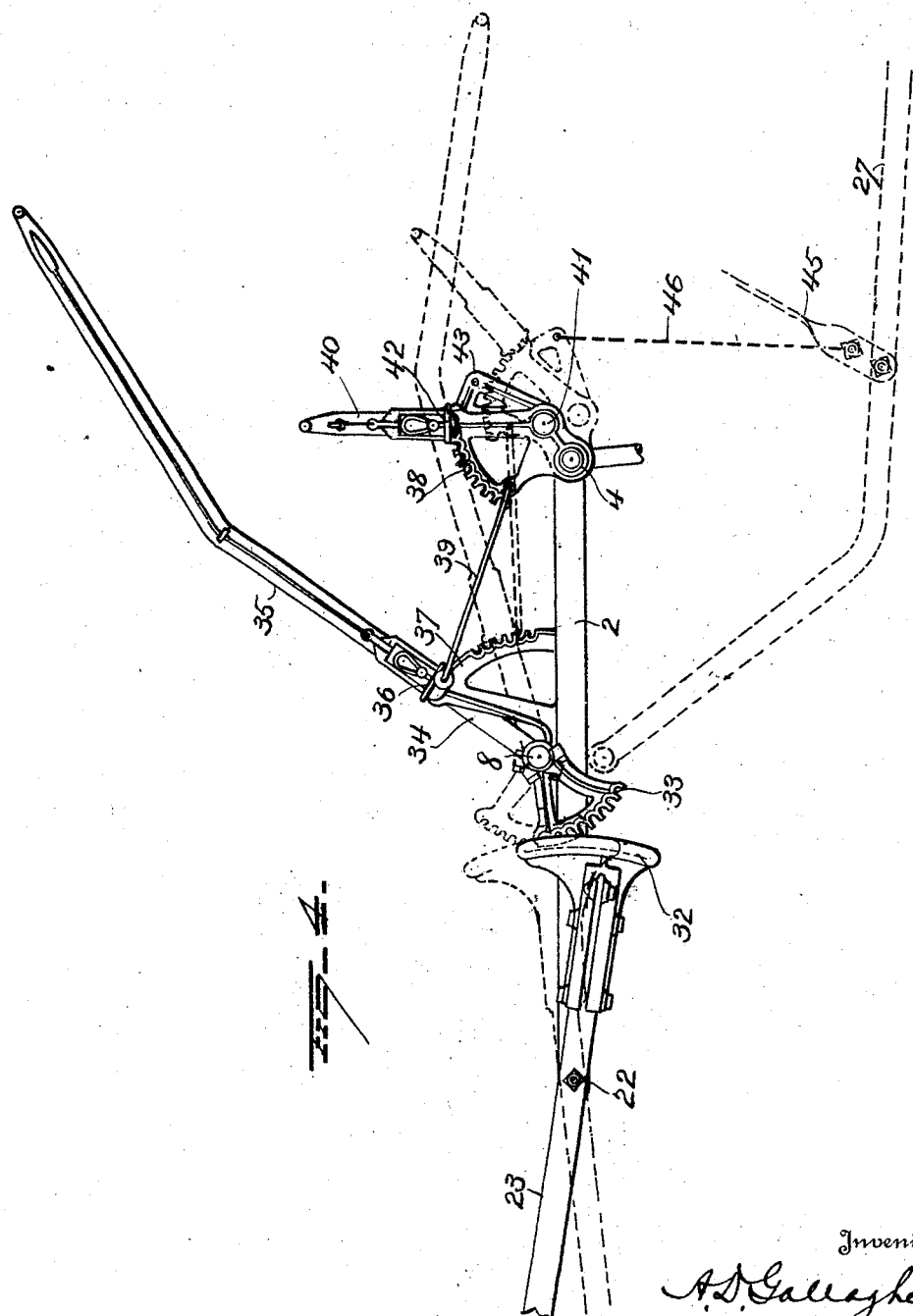

Patented Apr. 28, 1925.

1,535,914

UNITED STATES PATENT OFFICE.

ARTHUR D. GALLAGHER, OF SOUTH BEND, INDIANA, ASSIGNOR TO OLIVER CHILLED PLOW WORKS, OF SOUTH BEND, INDIANA.

WHEELED CULTIVATOR.

Application filed July 21, 1921. Serial No. 486,417.

*To all whom it may concern:*

Be it known that I, ARTHUR D. GALLAGHER, a citizen of the United States, and a resident of South Bend, in the county of Saint Joseph and State of Indiana, have invented certain new and useful Improvements in Wheeled Cultivators; and I do hereby declare the following to be a full, clear, and exact description of the invention, such as will enable others skilled in the art to which it appertains to make and use the same.

This invention relates to improvements in wheeled cultivators,—one object of the invention being to provide improved balancing means and tilting and raising means for wheeled cultivators.

A further object is to provide simple and efficient means which shall be so cooperable with the pole and with the operator's seat that the weight of the operator shall be utilized in an effectual manner in the raising and balancing of the gangs.

With these and other objects in view, the invention consists in certain novel features of construction and combinations of parts as hereinafter set forth and pointed out in the claims.

In the accompanying drawings; Figure 1 is a plan view of a cultivator embodying my improvements; Figure 2 is a central longitudinal section showing the positions of the parts when the gangs are in lowered position; Figure 3 is a sectional view similar to Fig. 2, showing the positions of the parts when the gangs are raised, and Figure 4 is a view illustrating the operating mechanism for effecting the raising of the cultivator gangs and for adjusting the same for depth of penetration.

The frame 1 of the cultivator comprises members 2, 2, the forward portions of which converge to form frame hounds 3, 3, and a tubular cross member 4 secured to the rear portions of the frame members 2, 2, constitutes the rear end of the frame. A front cross member 5 is disposed transversely under the frame 1 near the rear ends of the hound members 3, 3 thereof and the end portions of this cross member (which extend laterally beyond respective sides of the frame) may be provided with series of perforations 5ª whereby the forward ends of axle members may be adjustably connected therewith, through the medium of bearing brackets 6. The front cross bar or member 5 is supported from the frame 1 through the medium of brackets 7 and the latter project above the bar or member 5 and provide bearings for a rock-shaft 8,—the purpose of which will be hereinafter explained.

Carrying wheels 16 support the frame through the medium of axle members 10—11—15,—the members 10 telescoping into the tubular cross member 4 and the members being adjustably connected with the front bar 5.

The ends of the frame hounds are pivotally connected by a horizontal pivot pin at 22 with a pole or tongue 23 forwardly of the rear end of the latter,—it being understood, of course, that the forward end of the pole or tongue is connected with the neck-yoke of the draft team. A cross bar 24 is connected centrally between its ends, with the pole or tongue and from respective ends of said cross bar, draft bars 25 depend. The lower ends of the draft bars 25 are connected by draft links 26, 26 with the forward ends of cultivator gangs 27, and said draft bars are provided between their ends with series of perforations whereby singletrees 29 may be adjustably secured thereto. The cultivator gangs are provided with forwardly and upwardly projecting arms 30 which are pivotally and loosely mounted on the front cross bar or member of the frame so that they may swing and also be shifted laterally thereon to adjust the gangs relatively to each other, and the arms 30 of each cultivator gang are connected near the member 5, by cross bar 31.

To the rear end of the pivoted tongue or pole 23, a vertically disposed gear sector is rigidly secured and meshes with a gear sector 33 rigidly secured to the rock shaft 8. This rock shaft is provided at one end with a rearwardly projecting arm 34 to which a hand lever 35 is secured, a suitable manually operable detent 36 being mounted on said lever to engage a toothed segment 37 fixed to the frame 1. Toothed segments 38, 38 are loosely mounted on the rear tubular cross member 4 of the frame,—one over each of the cultivator gangs 27 and one of these segments is connected by a rod or link 39 with the lever 35. The other toothed segment 38 is connected, by means of a rod or link 39ª with an arm 34ª which projects rearwardly from the rock shaft at the end thereof opposite to that with which the lever 35 is connected. A hand lever 40 is pivotally mounted on each segment 38 at 41,—the position of the pivotal connection of said lever 40 to the segment 38 being somewhat above and rearwardly of the pivotal mounting of the segment on the rear frame member 4, as shown in full lines Fig. 4. Each lever 40 is provided with a suitable detent 42 to cooperate with the adjacent toothed segment 38, and each lever 40 is also provided with a rearwardly projecting arm 43. The arm 43 of each lever 40 is connected, by a chain 44 with one end of a bowed pressure spring 45 and the lower end of each spring 45 is connected with one of the cultivator gangs 27. The arms 43 of the levers 40 are also connected by chains 46 with the cultivator gangs,—the lower ends of said last-mentioned chains being conveniently secured to the lower portions of the pressure springs near the connections of the latter with the cultivator gangs. If desired each pair of chains 44—46 may be made in the form of a single chain.

The purpose of the hand levers 40 and their connections with the cultivator gangs is to provide means for adjusting the latter for depth of penetration of the earth-working members, and the construction is such that the cultivator gangs may always be raised practically the same height by means of the raising mechanism as hereinafter explained, whether the cultivator gangs be adjusted for deep or for shallow penetration. Such result is accomplished by locating the pressure spring connection with the eccentrically mounted lever 40 at such an angle that when said lever is operated, the distance between such connection and the pivotal mounting of the segment 38 to which said lever is eccentrically pivoted, will be increased or decreased according to the direction in which the lever may be moved. Thus it will be seen that when the gangs are raised by operation of the main lever 35, motion will be imparted to the segments 38 and the extent of raising of the gangs will be governed according to the adjustment of the levers 40 for deep or shallow penetration, the limit of height to which the gangs will be raised being practically the same whether the gangs be adjusted for deep or for shallow penetration.

In order that the weight of the driver may be utilized most effectually in the manipulation and operation of the cultivator gangs, the construction and arrangement of the driver's seat 46$^a$ and the cooperation of the seat rails with other parts of the mechanism, as now to be explained, may be employed.

The driver's seat 46$^a$ is mounted upon the rear end portions of rails 47, 47,—the intermediate portions of which rest and fulcrum on the rear tubular cross member 4 of the frame. The seat rails are provided at their forward ends with downwardly projecting arms 48 which are pivotally connected with arms 49 rigidly secured to and projecting rearwardly from the rock-shaft 8. The forward end portions of the seat rails may be provided with three holes for permitting such adjustable connection with the arms 49 on the rock shaft 8 as to accommodate drivers of different weights and the arms 49 may each be provided with two holes 50 to permit adjustment to accommodate cultivator gangs of different weight.

When the cultivator gangs are in the lowered position as shown in Figure 2, the main operating lever 35 will be in its low, approximately horizontal position and the seat rails will also be approximately horizontal, with the seat approximately in the position which it occupies when the cultivator is at work. Should the lever 35 be raised, power will be transmitted through the medium of the sectors 33 and 32, to the rear end of the tongue or pole 23, but as the forward end of the latter is connected with the neck yoke of the draft team and must not be raised, the forward portion of the frame and its pivotal connection 22 with the tongue will descend. Such movement of the frame (the axle members being connected with the frame at fixed positions) will operate to cause the axle structures and the wheels to move rearwardly and thus the excess weight of the gangs when raised will be counterbalanced. The operation of the lever 35 to effect the shifting of the frame and the counterbalancing of the gangs will also cause the rear portions of the gangs to be tilted. It will be observed that when the parts are in the positions shown in Figure 2, with the cultivator gangs level, the main lever may be moved in either direction, causing the rear ends of the gangs to be raised or lowered when the relations between the frame and the pole are shifted as previously explained, without materially affecting the front shovels of the gangs, the link 39—39$^a$ being approximately on dead center. By pushing the main lever 35 to the upper extent of its throw, both gangs will be fully raised.

During the raising of the gangs by operation of the main or master lever 35, the upward pressure imparted to said lever by the driver, will cause the driver's seat to descend. The greater the lifting force exerted by the driver on the lever, the greater will be the downward force (including the driver's weight) imparted to the seat and thus enhance the ease with which the raising operations may be effected. It is evident that by pressing the main lever 35 downwardly, the gangs will be lowered to the ground. Should the ground be such as to retard ready penetration of the earth-working members, the driver may throw his weight on said lever, taking weight correspondingly from the driver's seat, and thus the leverage will be greatly augmented to facilitate and insure proper penetration of said earth-working members.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a cultivator, the combination with a wheeled frame, a cultivator gang pivotally connected therewith, a pole, and a horizontal pivot connection between the forward portion of the frame and the pole forwardly of the rear end of the latter, of a lever mounted on the frame, connections between said lever and the cultivator gang, and power transmitting means between said lever and the rear end of the pole.

2. In a cultivator, the combination with a wheeled frame, a cultivator gang pivotally connected therewith, a pole, and a horizontal pivot connection between the forward portion of the frame and the pole forwardly of the rear end of the latter, of a lever mounted on the frame, connections between said lever and the cultivator gang, power transmitting means between the lever and the rear end of the pole, a seat, supporting rails for said seat fulcrumed on the rear portion of the frame, and connections between the forward portions of said seat rails and said lever.

3. In a cultivator, the combination with a wheeled frame, a cultivator gang pivotally connected therewith, a pole, and a horizontal pivot connection between the forward portion of the frame and the pole forwardly of the rear end of the latter, of a rock-shaft mounted at the forward portion of the frame, a lever secured to said rock shaft, connections between said rock shaft and cultivator gang, a vertically disposed gear sector secured to the rear end of the pole, and a vertically disposed gear sector secured to the rock shaft and meshing with the gear sector at the rear end of the pole.

4. In a cultivator, the combination with a wheeled frame, a cultivator gang pivotally connected therewith, a pole, and a horizontal pivot connection between the forward portion of the frame and the pole forwardly of the rear end of the latter, of a lever mounted on the frame, gearing between said lever and the rear end of the pole a toothed segment pivotally mounted on the frame, a lever pivoted to said segment means for locking said last-mentioned lever to said segment, connections between said last-mentioned lever and the cultivator gang, and means connecting the said segment with the first-mentioned lever.

5. In a cultivator, the combination with a wheeled frame, and a cultivator gang pivotally connected with the forward portion thereof, of a lever mounted on the frame, a toothed segment pivotally mounted on the frame, means connecting the pivoted segment with said lever, a lever eccentrically pivoted to said segment rearwardly of the pivotal mounting of the segment, and connections between said eccentrically pivoted lever and the cultivator gang.

6. In a cultivator, the combination with a wheeled frame, and a plurality of cultivator gangs pivotally connected with the forward portion of said frame, of a main lever mounted on the frame, means for locking said lever, toothed segments pivotally mounted on the frame, connections between the pivoted segments and said main lever, secondary levers eccentrically pivoted to said pivoted segments rearwardly of the pivotal mountings of the latter, means for locking said secondary levers to the toothed segments, and connections between the respective secondary levers and the respective cultivator gangs.

7. In a cultivator, the combination with a wheeled frame, a pole pivoted forwardly of its rear end to the forward portion of the frame, and cultivator gangs pivotally connected with said frame, of a rock-shaft mounted on the frame, a vertical gear sector secured to said rock-shaft, a vertical gear sector secured to the rear end of the pole and meshing with the first-mentioned gear sector, rearwardly projecting arms at respective ends of said rock-shaft, a main lever secured to one of said arms, a toothed segment secured to the frame, a detent on said lever to engage said segment, toothed segments pivoted on the frame, connections between the pivoted segments and the arms of said rock-shaft, levers eccentrically pivoted to the pivoted segments, means for locking said levers to the pivoted segments, and connections between said last-mentioned levers and the cultivator gangs.

8. In a cultivator, the combination with a wheeled frame, cultivator gangs pivotally connected with said frame, and a pole having horizontal pivot connection forwardly of its rear end with the forward portion of said frame, of a lever mounted on the frame, means operatively connecting said lever with the rear end of the pole, seat rails fulcrumed on the rear portion of the frame, a seat on the rear portions of said rails, and connections between the forward portions of said seat rails and said lever.

9. In a cultivator, the combination with a wheeled frame, cultivator gangs pivotally connected therewith, and a pole having a horizontal pivot connection forwardly of its rear end with the forward portions of said frame, of a rock-shaft mounted on the frame, vertically disposed gear sectors connecting the rock-shaft with the rear end of said pole, a lever secured to said rock-shaft, arms projecting rearwardly from said rock-shaft, seat rails fulcrumed on the rear portion of the frame and having arms at their forward ends pivoted to the arms on the rock-shaft, and a seat at the rear portions of said seat rails.

10. In a cultivator, the combination with a wheeled frame, cultivator gangs pivotally connected therewith, and a pole having a horizontal pivot connection forwardly of its rear end with the forward portion of the frame, of a rock-shaft mounted on the frame, means operatively connecting said rock-shaft with the rear end of the pole, a lever secured to said rock-shaft, arms projecting from said rock-shaft, seat rails fulcrumed on the frame, a seat supported by said rails, and means adjustable in two directions at an angle to each other for pivotally connecting the forward portions of the seat rails to said arms on the rock-shaft.

11. In a cultivator, the combination with a wheeled frame, a pole having a horizontal pivotal connection forwardly of its rear end with the forward portion of the frame, and cultivator gangs pivotally connected with said frame, of a rock-shaft mounted at the forward portion of said frame, means operatively connecting said rock-shaft with the rear end of said pole, arms projecting rearwardly from said rock-shaft and each having a plurality of holes, seat rails fulcrumed on the rear portion of the frame and provided at their forward ends with arms, each having a plurality of holes, pivot pins cooperable with any of the holes in the arms on the rock-shaft and the arms on the seat rails, whereby these parts may be adjustably pivoted together, and a seat supported by said rails.

12. In a cultivator, the combination with a wheeled frame, and a cultivator gang pivotally connected therewith, of a toothed segment pivoted on the frame, means for moving said segment, a lever pivoted eccentrically to said segment rearwardly of the pivotal support of the latter, a detent carried by said lever to engage the segment, a connection between said lever and the cultivator gang, a bowed pressure spring secured to the cultivator gang, and a connection between said lever and the upper portion of said spring.

13. In a cultivator, the combination with a wheeled frame and a cultivator gang pivotally connected therewith, of a toothed segment pivotally mounted on the frame, means for moving said segment, a lever pivoted eccentrically to said segment rearwardly of the pivotal support of the latter, a detent carried by said lever to engage said segment, said lever having an arm, a connection between said lever arm and the cultivator gang, a bowed pressure spring secured to the cultivator gang, and a connection between the upper portion of said spring and the lever arm.

In testimony whereof, I have signed this specification in the presence of two subscribing witnesses.

ARTHUR D. GALLAGHER.

Witnesses:
 JENNIE M. DAVIS,
 MARJORIE E. CULVER.